(12) United States Patent
Trinks et al.

(10) Patent No.: US 10,875,805 B2
(45) Date of Patent: Dec. 29, 2020

(54) APPARATUS AND METHOD FOR COOLING A GLASS STRAND PRODUCED BY MEANS OF TUBE DRAWING

(71) Applicant: SCHOTT AG, Mainz (DE)

(72) Inventors: Volker Trinks, Mitterteich (DE); Franz Ott, Konnersreuth (DE)

(73) Assignee: SCHOTT AG, Mainz (DE)

( * ) Notice: Subject to any disclaimer, the term of this patent is extended or adjusted under 35 U.S.C. 154(b) by 141 days.

(21) Appl. No.: 15/957,965

(22) Filed: Apr. 20, 2018

(65) Prior Publication Data
US 2018/0305238 A1    Oct. 25, 2018

(30) Foreign Application Priority Data

Apr. 21, 2017  (DE) .................. 10 2017 108 549

(51) Int. Cl.
*C03B 37/02*    (2006.01)
*C03B 25/04*    (2006.01)
*C03B 37/027*    (2006.01)

(52) U.S. Cl.
CPC .......... *C03B 37/0213* (2013.01); *C03B 25/04* (2013.01); *C03B 37/02718* (2013.01); *C03B 2205/55* (2013.01)

(58) Field of Classification Search
CPC . C03B 37/0213; C03B 37/0278; C03B 17/04; C03B 37/0206
See application file for complete search history.

(56) References Cited

U.S. PATENT DOCUMENTS

| 3,190,739 A | 6/1965 | Wilson |
| 3,260,586 A | 7/1966 | Prohaszka |
| 3,473,907 A | 10/1969 | Wilson |

(Continued)

FOREIGN PATENT DOCUMENTS

| DE | 1596373 | 2/1971 |
| DE | 19736644 | 8/1998 |

(Continued)

OTHER PUBLICATIONS

Crane, Flow of Fluids Through Valves, Fittings, and Pipe, Technical Paper No. 410, Crane Co., Printed 1991, p. 1-4. (Year: 1991).*

(Continued)

*Primary Examiner* — Lisa L Herring
(74) *Attorney, Agent, or Firm* — Ohlandt, Greeley, Ruggiero & Perle, L.L.P.

(57) ABSTRACT

The present disclosure provides the installation of an apparatus for cooling a manufactured glass rod. The apparatus has at least two cooling chambers arranged along the glass strand for sectional cooling of the glass strand. A gaseous cooling medium is either blown into the cooling chamber or sucked out of the cooling chambers. The glass strand is passed through each cooling chamber, with an orifice provided at each of the pass-through points, whose opening is larger than the cross-section or diameter of the glass strand. As a result, an annular gap forms between the opening and the surface of the glass strand, so that a turbulent flow of the gaseous cooling medium is generated, which enables a high cooling rate.

20 Claims, 2 Drawing Sheets

(56) References Cited

U.S. PATENT DOCUMENTS

| | | | | | |
|---|---|---|---|---|---|
| 3,873,293 | A | * | 3/1975 | Rudd | C03B 17/04 |
| | | | | | 65/84 |
| 4,034,803 | A | * | 7/1977 | Reed | F23L 15/04 |
| | | | | | 165/103 |
| 5,366,530 | A | * | 11/1994 | Weber | C03B 37/01815 |
| | | | | | 65/17.4 |
| 5,688,300 | A | * | 11/1997 | Ashley | C03B 17/04 |
| | | | | | 65/157 |
| 5,928,574 | A | * | 7/1999 | DiMarcello | C03B 37/02718 |
| | | | | | 264/1.1 |
| 2004/0011084 | A1 | * | 1/2004 | Lee | C03B 37/02718 |
| | | | | | 65/510 |
| 2013/0213616 | A1 | * | 8/2013 | Schalansky | F28F 13/12 |
| | | | | | 165/109.1 |
| 2018/0305238 | A1 | | 10/2018 | Trinks | |

FOREIGN PATENT DOCUMENTS

| | | |
|---|---|---|
| DE | 102017108549 | 10/2018 |
| EP | 0331691 | 1/1992 |
| EP | 1382581 | 1/2004 |
| GB | 1202630 | 8/1970 |

OTHER PUBLICATIONS

Spraying Systems Co., "Spray Products for Humidification from Spraying Systems Co.", https://www.spray.com/markets_and_applicatons/ humidification.aspx, Oct. 8, 2011 Wayback Machine capture, 2 pages. (Year: 2011).*

* cited by examiner

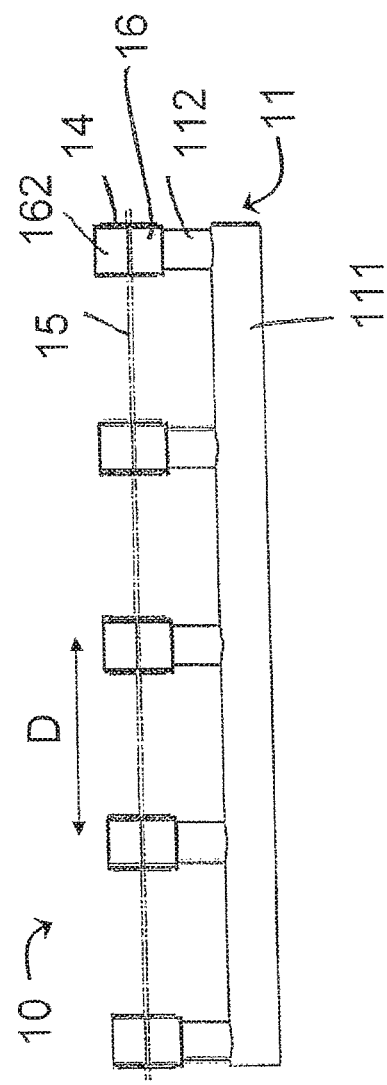
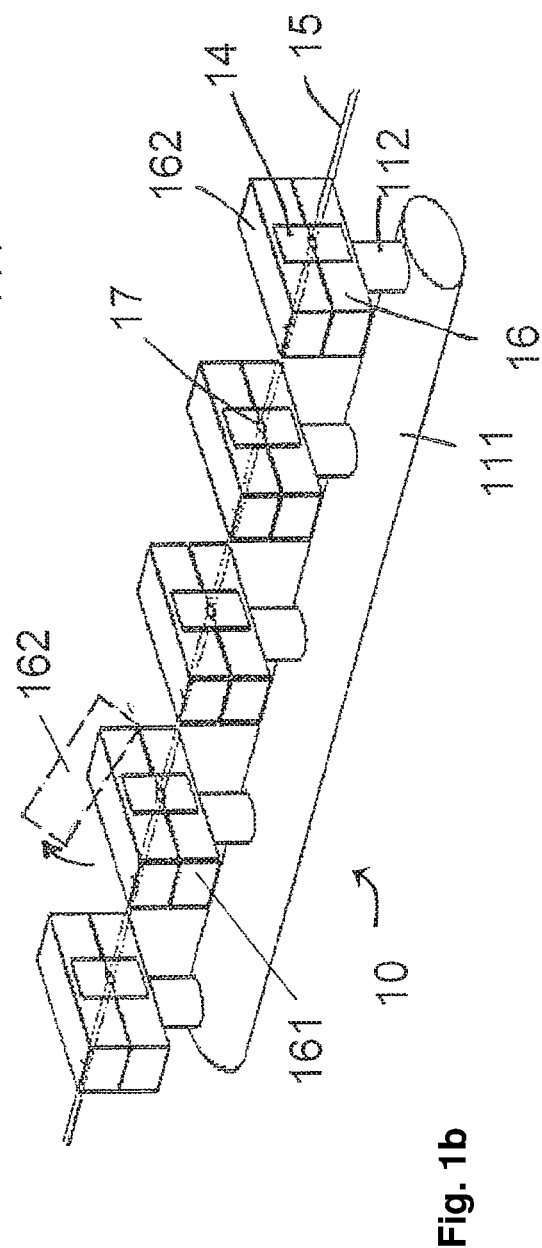
Fig. 1a
Fig. 1b

APPARATUS AND METHOD FOR COOLING A GLASS STRAND PRODUCED BY MEANS OF TUBE DRAWING

CROSS-REFERENCE TO RELATED APPLICATION

The present application claims the benefit of German Patent Application No. 10 2017 108 546.1, filed on Apr. 21, 2017, which is herein incorporated by reference.

BACKGROUND OF THE DISCLOSURE

1. Field of the Disclosure

The present disclosure relates to an apparatus and a method of cooling a glass strand produced by tube drawing. In particular, the present disclosure relates to the cooling of glass tubes or glass rods made from a glass strand or by a pipe, for example by where the so-called Vello or Danner process is used.

2. Description of the Related Art

German Patent No. DE-OS 1 596 373 discloses a manufacturing process in which a tubular glass strand is guided through a vacuum chamber to improve the shaping of the tubular glass strand or rod, resulting in a difference in pressure between the inner part of the tubular glass strand and the outer part. This supports the cylindrical shaping of the glass strand and prevents the glass strand from becoming deformed and, for example, from shrinking in parts and thus becoming oval, especially when the glass strand cools down. The chamber is used to produce a large vacuum of about 100-600 mm WS and has a length of about 60-900 cm, so that a long section of the heated and deformable glass strand can be exposed to the vacuum. The chamber is sealed at the feed-through points of the glass strand with close-fitting iris or closures made of asbestos against pressure loss and against cooling of the glass strand due to air flowing into the chamber at the feed-through points/pass-through points. The chamber is thus used for shaping and not for cooling the glass strand. As with an uncooled drawing or pulling line, the cooling is achieved by means of heat radiation and by simple convection, which however is complicated because of the closed construction of the chamber.

U.S. Pat. No. 3,873,293 discloses producing glass tubes to install at the beginning of the drawing or pulling line an apparatus in the form of an annular Venturi nozzle into which compressed air is blown. With the aid of compressed air, ambient air is sucked in, according to the injector principle, and an air flow along the glass strand section in the area of the nozzle is generated to cool the drawn glass strand. In order to achieve a noticeable cooling effect, a sufficient amount of compressed air must be supplied. This apparatus is therefore a cooling apparatus. And in fact, the cooling of the glass strand is contactless, but due to the short length of the apparatus it is locally limited to a relatively short section of the glass strand and thus has only a small cooling effect.

British Patent No. GB 1 202 630 describes a tunnel-shaped apparatus for cooling a drawn glass strand, whereby the tunnel encloses a longer section of the glass strand. By means of an air extraction system close to the entry point, a largely uniform air flow is generated in this elongated tunnel, which is guided along the glass strand according to the reverse flow principle. However, a noticeable cooling effect can only be achieved if the air extraction is sufficiently large. Although the cooling process covers a longer section of the glass strand, it cannot be varied very widely. Because of the long construction length of the tunnel and the reverse flow principle used, the cooling must be adjusted in such a way that a practicable cooling gradient pattern is maintained within the tunnel.

Furthermore, European Patent No. EP 0 331 691 B1 discloses an apparatus and a method of cooling an optical fiber when it is drawn from a heated glass blank, the drawn fiber passing through a cooling zone and a gaseous coolant being led axially to the fiber around the fiber through the cooling zone.

Thus, apparatuses and processes are known in which cooling of the drawn glass strand is achieved by free convection or by blowing with a gaseous medium (air).

In addition, there are devices for shaping which do not focus on cooling, such as the apparatus known from DE-OS 1 596 373. Another apparatus of this kind is described in U.S. Pat. No. 3,190,739, where the still hot glass tube is brought into contact with a molded part to improve the cylinder shape. Since the molded part is relatively cold, cooling takes place by direct contact of the glass surface with the molded part surface, the so-called die. This, in turn, is detrimental to the quality of the glass tube produced, because direct contact can lead to the formation of surface defects in the glass, which can then no longer be compensated for.

In addition, there are also known devices and processes in which cooling takes place by spraying the glass tube with water. For example, the patent document U.S. Pat. No. 3,260,586 can be mentioned. There, the liquid cooling medium (water) comes into direct contact with the glass surface, which can also have a detrimental effect on the surface quality of the glass tube and does not produce a constant cooling rate due to the possible formation of steam on the glass surface.

SUMMARY OF THE DISCLOSURE

It is therefore the object of the present disclosure to propose an apparatus and a method of cooling a tube-drawn glass strand produced by means of tube drawing which overcomes the disadvantages mentioned above. In particular, non-contact cooling is to be achieved which has no negative influence on the surface quality of the manufactured glass product and which is fast but also variable.

Accordingly, the present disclosure provides an apparatus comprising at least two cooling chambers arranged at a distance from each other along the glass strand for sectional cooling of the glass strand. The cooling chambers are connected to a device for supplying or discharging a gaseous cooling medium. The glass strand passes through each cooling chamber, and in each case an orifice is provided at the feed-through points. The opening of the orifice is larger than the cross-section or diameter of the glass strand, in order to generate a turbulent flow of the gaseous cooling medium. The flow is formed between the opening and the surface of the glass strand.

A method of cooling a glass strand produced by tube drawing is also proposed, wherein the glass strand is guided through two or more cooling chambers arranged adjacent to each other along the glass strand for sectional cooling, whereby a turbulent flow of a gaseous cooling medium is generated at the feed-through points between the opening and the surface of the glass strand.

These measures enable the glass strand to be cooled down in a non-contacting and particularly effective manner. Due to the turbulent flow of the cooling medium generated at the orifice plate openings, a high cooling rate can be achieved even at low flow rates. In particular, rapid cooling is generated at the inlet and outlet openings of each chamber. The apparatus can be designed for both suction and blowing of the gaseous cooling medium. Through the use of orifice plates with pre-determined flow openings, it is possible to form a specific gap around the glass strand, which results in an optimal turbulent flow with high flow velocity. For example, the shape of the orifice plate forms a circular annular gap, but other shapes are also possible.

The cooling chambers can be arranged at a predetermined distance from each other.

The apparatus for supplying or discharging a gaseous cooling medium can be designed as a ventilation system which blows the gaseous cooling medium into each of the cooling chambers or sucks it out from the environment through each of the cooling chambers.

For the adaptation to the dimensions of the glass strand, it is advantageous to have orifices of different sizes and/or with different openings interchangeably mounted on the cooling chambers. Alternatively, the respective orifice can also have a variable opening.

The preferred choice between the opening and the surface of the glass rod is a gap with a pre-defined width (column width) of 5 to 20 mm through which the turbulent flow of the gaseous cooling medium flows out of or into the respective cooling chamber. The length of the respective cooling chamber is preferably less than 600 mm.

The apparatus also has a device suitable for blowing the gaseous cooling medium into the cooling chambers or for sucking the gaseous cooling medium from the cooling chambers. The equipment is designed in such a way that a preset volume flow rate is achieved. The gaseous cooling medium can be a cooled or uncooled gaseous medium, especially ambient air. The gaseous cooling medium can also be a gaseous medium enriched or supersaturated with liquid droplets, in particular with water droplets. This enrichment is preferably generated by atomizing or spraying the liquid, in particular water, into a volume flow of a gaseous medium. The turbulent flow of the gaseous cooling medium preferably has a Reynolds number greater than 2300.

In the course of the pipe drawing process, the apparatus is preferably arranged between a forming tool and a separating unit, the drawing/pulling line. It may be provided that the respective cooling chamber has a lower housing portion and an upper housing portion which is detachable or hinged from the lower housing portion. The cooling chambers are preferably arranged at a definable distance and/or in a definable number to each other.

DESCRIPTION OF THE DRAWINGS

FIG. 1a shows a side view of the construction of an apparatus with several cooling chambers according to the present disclosure.

FIG. 1b shows a perspective view of the apparatus of FIG. 1a.

DETAILED DESCRIPTION OF THE DISCLOSURE

Figure 2:
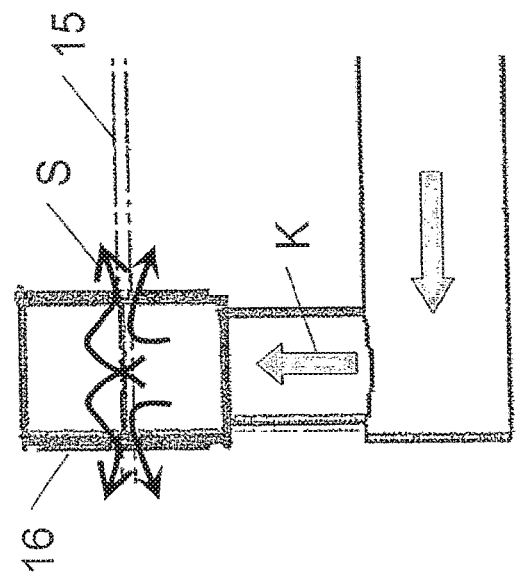
FIG. 2 is a sectional view of the apparatus shown in FIGS. 1a and 1b, illustrating the generation, in the passband of the glass strand, a flow path of the gaseous cooling medium.

FIGS. 1a and 1b show in different views the construction of an apparatus 10 in accordance with the present disclosure, which serves to cool a glass strand 15 produced by tube drawing. For this purpose, the apparatus 10 comprises several cooling chambers 16 arranged along the glass strand 15 and enabling a cooling of the glass strand 15 in sections. The cooling chambers 16 shown here have an overall length of less than 600 mm and are connected to a device 11 for the supply or discharge of a gaseous cooling medium K. The cooling chamber 16 has a length of less than 600 mm. The glass strand 15 is passed through each of the cooling chambers 16, whereby an orifice 14 being provided at the respective feed-through/pass-through points and having an opening 17 which is larger than the cross-section or diameter of the glass strand. In this way, the respective orifice plate 14 is provided with an opening 17 or outlet opening, which allows the effusion or entering of the gaseous cooling medium K and which is dimensioned in such a way that a turbulent flow S with Reynolds number Re>2300 is formed between the opening 17 and the surface of the glass rod 15. This will be described in more detail below with respect to FIGS. 2 and 3a-3c.

As shown in FIGS. 1a and 1b, for example, the glass strand 15 is passed through five cooling chambers 16 arranged one after the other. The cooling chambers 16, also referred to as cooling elements, are arranged at a distance D from each other, which is 0.5 m, for example. In tests, chamber distances of 0.2 and 0.3 m as well as distances greater than 0.5 m have also proven to be effective. For example, each cooling chamber 16 is not longer than 600 mm and thus much shorter than the cooling chambers known from the state of the art. In addition, there are orifice plates 14 on the passage areas which do not come into direct contact with the glass strand 15. Rather, the orifices have an opening 17 defined in size and shape, whose width is always larger than the cross-section or diameter of the glass strand 15. Thus, a gap R (see also FIGS. 3a-3c) is created between the opening and the glass strand, which causes a certain turbulence in the cooling chamber 16 when the gaseous cooling medium K is blown in or sucked out and thus generates a turbulent flow S in the annular gap R (see also FIG. 2).

FIGS. 1a and 1b show that the respective cooling chambers 16 have a lower housing portion 161 and an upper housing portion 162. The upper portion of the housing 162 is hinged so that the glass strand 15 can be easily inserted into the respective cooling chamber. The ambient air, which can be supplied either uncooled or cooled via device 11 or by the pipe system, consisting of central ventilation duct 111 and branch ducts 112, is suitable as gaseous cooling medium K. The apparatus proposed here achieves a high heat transfer due to the turbulent air flow at high speed at the large number of orifice plates. This in turn leads to a very effective cooling of the glass strand 15.

As an alternative to the construction of the ventilation apparatus 11 shown here, only a single central ventilation duct or the like (e. g. square ventilation duct) can be provided, which is directly connected to the individual chambers. The previously mentioned branch duct 112 are not used in this case. A variety of solutions are available for the technical design of the ventilation area.

As shown in FIG. 2, each cooling chamber 16 is blown in via the ventilation system. Thus, the cooling medium K, in this case ambient air, flows into the actual cooling chamber 16 and swirls while passing through the narrow annular gap R at the outlet (see FIGS. 3a-3c). Thus an annular gap area R is formed that generates a turbulent flow S which cools the glass strand 15 contact-free and very effectively.

Figures 3A, 3B, 3C:
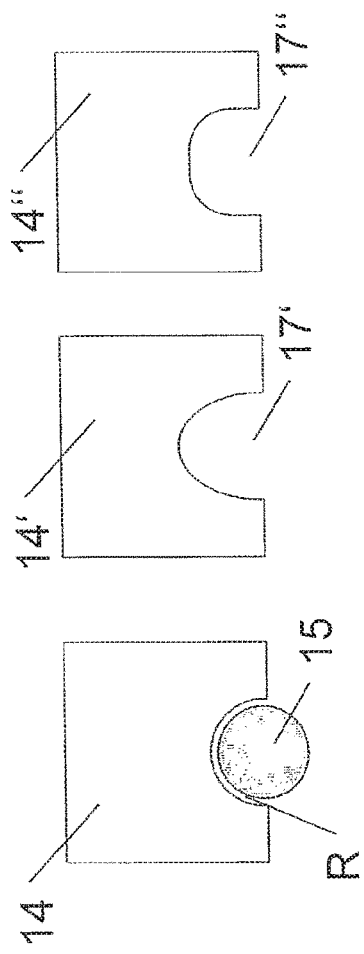
FIGS. 3a, 3b, and 3c show three sectional views of the upper half of the differently designed orifice plates for the apparatus of FIGS. 1a and 1b.

FIGS. 3a-3c show examples of different types of orifice plates 14, 14' and 14" which differ essentially in their respective design of the orifice plate opening. For example, the first orifice 14 has a circular opening. The second orifice 14' has an elliptical opening 17' and the third orifice 14" has an approximately rectangular opening 17' with rounded ends. In this way, the orifice can be adapted to the cross-sectional shape of the glass rod 15. Likewise, it is also possible to achieve a change in the formed flow S or turbulence by varying the opening.

The following method of cooling the glass rod 15 is used for the apparatus shown herein.

First, the glass strand 15 is passed through several cooling chambers 16 arranged along the glass strand for sectional or sectional cooling. Then a turbulent flow of a gaseous cooling medium, such as air, is generated at the feed-through points between the opening of the respective orifice plate and the surface of the glass rod. The glass strand 15 or the manufactured glass tube or rod are thus essentially cooled at several sections by a symmetrical air streaming around the tube at high speed. The installed orifice plates with the openings can be designed variably in order to be adapted to the geometry of the strand to be cooled and/or to change the desired flow. The method and the apparatus can be used for both suction/intake and blowing/outtake cooling. The gaseous cooling medium is either sucked into the cooling chambers by the respective orifice plates or is blown out of the cooling chambers by the orifice plates. The design described here achieves a high flow rate of the gaseous cooling medium with a turbulent flow, whereby a high heat transfer between the glass surface of the glass strand and the cooling medium is achieved. The cooling capacity can be varied by the number of cooling chambers or cooling elements 16, by the geometry of the annular gap R, by changing the air pressure and/or the air volume. It can also be provided that the gaseous cooling medium is enriched with moisture, e. g. in the form of water droplets or steam, in order to increase the specific heat capacity.

The concept proposed here is particularly characterized by the following advantages:
- A uniform and targeted cooling with a defined adjustable high cooling speed is achieved over the glass strand circumference or glass tube circumference.
- A reduction in the amount of cooling medium required for cooling is achieved by using two or more cooling chambers, whereby a high heat transfer between the glass surface and the cooling medium is achieved at their respective openings. This also improves overall cooling efficiency.
- Due to non-contact cooling, the surface of the glass remains intact and is not damaged by cracks, scratches or similar defects.
- By varying the number of cooling elements, adjusting the pressure or the amount of the cooling medium, a significantly improved cooling performance can be achieved, whereby a shorter drawing line with a reduced number of drawing line elements, in particular running or supporting rollers for the glass strand, can be realized. This in turn reduces the overall space requirement for a drawing system. In addition, it is possible to increase the performance of existing pipe trains and expand the range of products that can be produced.

In summary, it is proposed to install an apparatus for cooling a manufactured glass rod during the course of a pipe train. The apparatus has at least two cooling chambers or cooling elements arranged along the glass strand for sectional cooling of the glass strand. In this process, a gaseous cooling medium is either blown into the cooling chambers or sucked out of the environment through the chambers. The glass strand is fed through each cooling chamber, with an orifice plate at the entry points, the opening of which is larger than the diameter of the glass strand. As a result, an annular gap forms between the opening and the surface of the glass strand, so that a turbulent flow of the gaseous cooling medium is generated, which enables a high cooling rate and also avoids material stress in the final product.

Due to the short overall length of the cooling chambers and the optimized slot width of the annular gap, very high flow velocities in the orifice area can be achieved. The diameter of the glass strand can be used as a guideline for the optimized dimensioning of the annular gap. If this is in the range of about 10 mm, the annular gap should be about 20 mm. If the diameter of the glass rod is greater than 10 mm, the annular gap may be larger (about 30 mm); if the diameter is less than 10 mm, the annular gap may be smaller (about 10 mm). Internal tests carried out by the applicant have shown that very high cooling rates of approx. 25-35 K/m can be achieved for glass tubes with an outer diameter of approx. 10 mm and a throughput (mass flow) of 525 kg/h. For example, an apparatus with five cooling chambers or cooling elements was used to guide a glass tube with an outer diameter of 10.75 mm and a wall thickness of 0.5 mm at an inlet temperature of 435° C. The tube was fitted with a glass tube with an outer diameter of 10.75 mm and a wall thickness of 0.5 mm. With a mass flow of 525 kg/h, a Reynolds number of 14400 could be calculated and a cooling rate of 27 K/m could be measured.

With variable cooling, e. g. by using different orifice plates on cooling chambers, the desired glass temperature can be set exactly for different production conditions, e. g. for separation processes or for the coating of pipes.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment disclosed as the best mode contemplated for carrying out this disclosure.

LIST OF THE REFERENCE SIGNS 10 apparatus with several cooling chambers for cooling a glass rod
11 device (ventilation device) for supplying or discharging a gaseous cooling medium (ambient air)
111 central ventilation conduit
112 branch conduit
14 orifice of cooling chamber
14', 14" further versions thereof
15 glass strand (pipe train)
16 cooling chamber
161 lower housing portion
162 upper housing portion, hinged
17 opening of the orifice (permeable opening for glass strand)

17', 17" further versions thereof
D distance between the cooling chambers
K gaseous cooling medium (here: ambient air)
R annular gap between orifice and glass strand
S turbulent flow in the area of the outlet orifice rate.

The invention claimed is:

1. An apparatus for cooling a glass strand produced by tube drawing, comprising:
   at least two cooling chambers arranged at a distance along the glass strand for a sectional cooling of the glass strand,
   wherein the at least two cooling chambers are connected to a device for supplying or discharging a gaseous cooling medium,
   wherein the glass strand is passed through each cooling chamber at pass-through points, and an orifice is provided at each of the pass-through points,
   wherein each of the orifices has a variable opening, and wherein the variable opening of each of the orifices is larger than a cross-section of the glass strand, in order to generate a turbulent flow of the gaseous cooling medium between the variable opening of each of the orifices and a surface of the glass strand, and
   wherein the turbulent flow of the gaseous cooling medium has a Reynolds number greater than 5000.

2. The apparatus according to claim 1, wherein the at least two cooling chambers are arranged at a predetermined distance from each other.

3. The apparatus according to claim 1, wherein the device is a ventilation system which blows the gaseous cooling medium into each of the at least two cooling chambers or sucks it from the environment through each of the at least two cooling chambers.

4. The apparatus according to claim 1, further comprising a predetermined annular gap between the variable opening of each of the orifices and the surface of the glass strand through which the turbulent flow of the gaseous cooling medium flows out of a respective cooling chamber or flows into the respective cooling chamber.

5. The apparatus according to claim 4, wherein the predetermined annular gap has a dimension of 5 to 20 mm.

6. The apparatus according to claim 1, wherein each of the at least two cooling chambers has a lengthwise dimension of less than 600 mm in a longitudinal direction of the glass strand.

7. The apparatus according to claim 1, wherein the device blows the gaseous cooling medium into the at least two cooling chambers or sucks off the gaseous cooling medium from the at least two cooling chambers.

8. The apparatus according to claim 7, wherein the device sucks or blows out the gaseous cooling medium at a predetermined volumetric flow rate.

9. The apparatus according to claim 1, wherein the gaseous cooling medium is a cooled or uncooled gaseous medium.

10. The apparatus according to claim 1, wherein the gaseous cooling medium is a gaseous medium enriched or supersaturated with liquid droplets.

11. The apparatus according to claim 10, wherein the gaseous medium enriched or supersaturated with liquid droplets is produced by atomizing or spraying water.

12. The apparatus according to claim 1, wherein the apparatus is arranged between a shaping tool and a separating unit.

13. The apparatus according to claim 1, wherein a number of the at least two cooling chambers can be modified.

14. The apparatus according to claim 1, wherein the size of the variable opening of each of the orifices is adapted to a dimension of the glass strand.

15. An apparatus for cooling a glass strand produced by tube drawing, comprising:
   at least two cooling chambers arranged at a distance along the glass strand for a sectional cooling of the glass strand,
   wherein the at least two cooling chambers are connected to a device for supplying or discharging a gaseous cooling medium,
   wherein the glass strand is passed through each cooling chamber at pass-through points, and an orifice is provided at each of the pass-through points,
   wherein each of the orifices has an opening, and wherein the opening of each of the orifices is larger than a cross-section of the glass strand, in order to generate a turbulent flow of the gaseous cooling medium between the opening of each of the orifices and a surface of the glass strand, and
   wherein each cooling chamber comprises a lower housing portion and an upper housing portion which is detachable from or hinged to the lower housing portion.

16. An apparatus for cooling a glass strand produced by tube drawing, comprising:
   at least two cooling chambers arranged at a distance along the glass strand for a sectional cooling of the glass strand,
   wherein the at least two cooling chambers are connected to a device for supplying or discharging a gaseous cooling medium,
   wherein the glass strand is passed through each cooling chamber at pass-through points, and an orifice is provided at each of the pass-through points,
   wherein each of the orifices has a variable opening, wherein the variable opening of each of the orifices is larger than a cross-section of the glass strand, in order to generate a turbulent flow of the gaseous cooling medium between the variable opening of each of the orifices and a surface of the glass strand, and
   wherein the size of the variable opening of each of the orifices is adapted to a dimension of the glass strand.

17. A method for cooling a glass strand produced by tube drawing, comprising the steps of:
   passing the glass strand through at least two cooling chambers arranged at a distance along the glass strand, for sectional cooling, wherein the glass strand passes through the at least two cooling chambers at pass-through points, and wherein the pass-through points each have an orifice with a variable opening; and
   forming a turbulent flow, at the pass-through points, of a gaseous cooling medium between openings of the cooling chambers and a surface of the glass strand,
   wherein the turbulent flow of the gaseous cooling medium has a Reynolds number greater than 5000.

18. The method according to claim 17, further comprising the step of:
   blowing the gaseous cooling medium into the at least two cooling chambers at a predetermined volume flow rate; or
   sucking the gaseous cooling medium out of the at least two cooling chambers.

19. The method according to claim 17, wherein the gaseous cooling medium is a cooled or uncooled gaseous medium.

20. The method according to claim 17, wherein the gaseous cooling medium is enriched or supersaturated with liquid droplets.

\* \* \* \* \*